United States Patent
Missig et al.

(10) Patent No.: US 11,921,959 B2
(45) Date of Patent: Mar. 5, 2024

(54) DYNAMIC USER INTERFACE ADAPTABLE TO MULTIPLE INPUT TOOLS

(71) Applicant: Apple Inc., Cupertino, CA (US)

(72) Inventors: Julian Missig, Burlingame, CA (US); May-Li Khoe, San Francisco, CA (US); Bianca Cheng Costanzo, Barcelona (ES); Jeffrey Traer Bernstein, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/972,508

(22) Filed: Oct. 24, 2022

(65) Prior Publication Data
US 2023/0221822 A1 Jul. 13, 2023

Related U.S. Application Data

(63) Continuation of application No. 17/353,722, filed on Jun. 21, 2021, now Pat. No. 11,481,073, which is a (Continued)

(51) Int. Cl.
*G06F 3/044* (2006.01)
*G06F 3/0354* (2013.01)
(Continued)

(52) U.S. Cl.
CPC ........ *G06F 3/0442* (2019.05); *G06F 3/03545* (2013.01); *G06F 3/041* (2013.01);
(Continued)

(58) Field of Classification Search
CPC .... G06F 3/0442; G06F 3/03545; G06F 3/041; G06F 3/04162; G06F 3/0441; G06F 3/04847; G06F 3/0488; G06F 2203/04106
See application file for complete search history.

(56) References Cited

U.S. PATENT DOCUMENTS 5,627,914 A    5/1997  Pagallo
6,154,221 A *  11/2000 Gangnet ............... G06T 11/203
                                              345/474
(Continued)

FOREIGN PATENT DOCUMENTS

KR       2010-0046087 A    5/2010

OTHER PUBLICATIONS

Bautista, "Microsoft Mathematics Tutorial 7—The Ink Input," Mathematics and Multimedia Forum, http://mathandmultimedia.com/2012/05-23/microsoft-math-tutorial-7-ink>, May 23, 2012, 6 pages.

(Continued)

*Primary Examiner* — Amy Onyekaba
(74) *Attorney, Agent, or Firm* — Morgan, Lewis & Bockius LLP

(57) ABSTRACT

A computing device having a touch-sensitive surface and a display, detects a stylus input on the touch-sensitive surface while displaying a user interface. A first operation is performed in the user interface in accordance with a determination that the stylus input includes movement of the stylus across the touch-sensitive surface while the stylus is detected on the touch-sensitive surface. A second operation different from the first operation is performed in the user interface in accordance with a determination that the stylus input includes rotation of the stylus around an axis of the stylus while the stylus is detected on the touch-sensitive surface. A third operation is performed in the user interface in accordance with a determination that the stylus input includes movement of the stylus across the touch-sensitive surface and rotation of the stylus around an axis of the stylus while the stylus is detected on the touch-sensitive surface.

15 Claims, 13 Drawing Sheets

Related U.S. Application Data continuation of application No. 16/445,108, filed on Jun. 18, 2019, now Pat. No. 11,042,250, which is a continuation of application No. 15/607,186, filed on May 26, 2017, now Pat. No. 10,324,549, which is a continuation of application No. 14/616,532, filed on Feb. 6, 2015, now Pat. No. 9,665,206, which is a continuation of application No. 14/030,682, filed on Sep. 18, 2013, now abandoned.

(51) Int. Cl.
  *G06F 3/041* (2006.01)
  *G06F 3/04847* (2022.01)
  *G06F 3/0488* (2022.01)

(52) U.S. Cl.
  CPC ........ *G06F 3/04162* (2019.05); *G06F 3/0441* (2019.05); *G06F 3/04847* (2013.01); *G06F 3/0488* (2013.01); *G06F 2203/04106* (2013.01)

(56) References Cited

U.S. PATENT DOCUMENTS

| | | | |
|---|---|---|---|
| 6,180,894 B1 | 1/2001 | Chao et al. | |
| 6,227,743 B1 | 5/2001 | Robb | |
| 6,266,684 B1 | 7/2001 | Kraus et al. | |
| 6,326,956 B1* | 12/2001 | Jaeger | G06F 3/0321 345/179 |
| 6,551,357 B1 | 4/2003 | Madduri | |
| 6,670,952 B2 | 12/2003 | Jaeger et al. | |
| 6,891,551 B2 | 5/2005 | Keely et al. | |
| 6,904,405 B2 | 6/2005 | Suominen | |
| 6,956,564 B1* | 10/2005 | Williams | H04M 19/00 178/19.04 |
| 7,218,326 B1* | 5/2007 | Bogues | G06T 11/203 345/441 |
| 7,259,752 B1 | 8/2007 | Simmons | |
| 7,496,416 B2* | 2/2009 | Ferguson | G06T 15/80 345/949 |
| 7,532,206 B2 | 5/2009 | Morrison et al. | |
| 7,966,352 B2 | 6/2011 | Madan et al. | |
| 8,278,571 B2* | 10/2012 | Orsley | G06F 3/03545 345/173 |
| 8,566,721 B2* | 10/2013 | Langmacher | G11B 27/034 345/473 |
| 8,599,143 B1* | 12/2013 | Rymarz | G06F 3/03545 345/173 |
| 8,736,586 B2* | 5/2014 | Tan | G06F 1/1626 345/179 |
| 9,310,923 B2* | 4/2016 | Krah | G06F 3/0383 |
| 9,552,084 B2* | 1/2017 | Takahashi | G06F 1/3262 |
| 9,760,187 B2* | 9/2017 | Havilio | G06F 3/03545 |
| 9,766,723 B2* | 9/2017 | Hicks | G06F 3/0416 |
| 10,055,030 B2* | 8/2018 | Stringer | G06F 3/0488 |
| 10,120,446 B2* | 11/2018 | Pance | G06F 3/041 |
| 10,275,049 B2* | 4/2019 | Pedersen | G06F 3/04162 |
| 2002/0149630 A1 | 10/2002 | Kitainik et al. | |
| 2003/0146907 A1* | 8/2003 | Boals | H04L 67/06 345/179 |
| 2004/0051700 A1* | 3/2004 | Pensjo | G06F 1/1626 345/173 |
| 2005/0057534 A1* | 3/2005 | Charlier | G06F 3/042 345/179 |
| 2005/0184973 A1 | 8/2005 | Lum et al. | |
| 2005/0190163 A1* | 9/2005 | Sarasmo | G06F 3/03545 345/179 |
| 2006/0026535 A1 | 2/2006 | Hotelling et al. | |
| 2006/0209040 A1* | 9/2006 | Garside | G06F 3/02 345/173 |
| 2007/0004461 A1 | 1/2007 | Bathina et al. | |
| 2007/0077541 A1* | 4/2007 | Champagne | A63F 13/10 434/62 |
| 2007/0093913 A1* | 4/2007 | Ferguson | G06T 15/50 700/1 |
| 2007/0115264 A1 | 5/2007 | Yu et al. | |
| 2007/0154116 A1* | 7/2007 | Shieh | G06F 3/0425 382/314 |
| 2007/0195069 A1* | 8/2007 | Kable | G06F 3/03545 345/179 |
| 2007/0242056 A1* | 10/2007 | Engelhardt | G06F 3/04883 345/173 |
| 2008/0036747 A1* | 2/2008 | Hope | G06F 1/1626 345/179 |
| 2009/0002392 A1 | 1/2009 | Hou et al. | |
| 2009/0167728 A1 | 7/2009 | Geaghan et al. | |
| 2010/0006350 A1* | 1/2010 | Elias | G06F 3/0445 178/19.03 |
| 2010/0083116 A1* | 4/2010 | Akifusa | G06F 3/04847 715/727 |
| 2010/0090988 A1 | 4/2010 | Park | |
| 2010/0110021 A1* | 5/2010 | Chiu | G06F 3/046 345/173 |
| 2010/0188371 A1* | 7/2010 | Lowles | G06F 3/04886 345/178 |
| 2010/0194693 A1* | 8/2010 | Selin | G06F 3/0488 345/173 |
| 2010/0211902 A1* | 8/2010 | Unsworth | G06F 3/03545 715/862 |
| 2010/0214257 A1 | 8/2010 | Wussler et al. | |
| 2010/0235735 A1 | 9/2010 | Ording et al. | |
| 2010/0271307 A1* | 10/2010 | Yen | G06F 1/1643 345/175 |
| 2011/0050613 A1* | 3/2011 | Jiang | G06F 1/1626 345/173 |
| 2011/0074701 A1* | 3/2011 | Dickinson | G06F 3/041 345/173 |
| 2011/0122087 A1 | 5/2011 | Jang et al. | |
| 2011/0215914 A1* | 9/2011 | Edwards | G06F 3/041 345/173 |
| 2011/0258537 A1 | 10/2011 | Rives et al. | |
| 2011/0310031 A1* | 12/2011 | Harris | G06F 3/038 345/173 |
| 2012/0049759 A1* | 3/2012 | Pezzutti | H05B 47/19 315/291 |
| 2012/0050293 A1* | 3/2012 | Carlhian | G06T 11/203 345/442 |
| 2012/0092355 A1 | 4/2012 | Yamamoto et al. | |
| 2012/0127110 A1* | 5/2012 | Amm | G06F 3/03545 345/174 |
| 2012/0182271 A1* | 7/2012 | Wu | G06F 3/03545 345/179 |
| 2012/0262407 A1* | 10/2012 | Hinckley | G06F 3/04883 345/173 |
| 2012/0306927 A1* | 12/2012 | Lee | G06F 3/03545 345/173 |
| 2012/0331546 A1* | 12/2012 | Falkenburg | G06T 11/001 726/16 |
| 2013/0106731 A1* | 5/2013 | Yilmaz | G06F 3/0441 345/173 |
| 2013/0106795 A1* | 5/2013 | Sundara-Rajan | G06F 3/0412 345/179 |
| 2013/0120281 A1* | 5/2013 | Harris | G06F 3/03545 345/173 |
| 2013/0249814 A1* | 9/2013 | Zeng | G06F 3/04817 345/173 |
| 2013/0254714 A1* | 9/2013 | Shin | G06F 3/0488 715/810 |
| 2013/0257777 A1* | 10/2013 | Benko | G06F 3/0383 345/173 |
| 2013/0298073 A1* | 11/2013 | Kim | G06F 3/041 715/780 |
| 2013/0311922 A1* | 11/2013 | Park | H04M 1/656 715/764 |
| 2013/0328810 A1* | 12/2013 | Li | G06F 3/04883 345/173 |
| 2014/0015780 A1* | 1/2014 | Kim | G06F 16/9554 345/173 |
| 2014/0022193 A1* | 1/2014 | Kim | G06F 3/03545 345/173 |

(56) References Cited

U.S. PATENT DOCUMENTS

| | | | | |
|---|---|---|---|---|
| 2014/0028577 A1* | 1/2014 | Krah | G06F 3/0446 | 345/173 |
| 2014/0053113 A1* | 2/2014 | Zoon | G06F 3/04845 | 715/863 |
| 2014/0071098 A1* | 3/2014 | You | G06F 3/03545 | 345/179 |
| 2014/0098072 A1* | 4/2014 | Singh | G06F 3/03545 | 345/179 |
| 2014/0101579 A1* | 4/2014 | Kim | G06F 3/04845 | 715/761 |
| 2014/0160045 A1* | 6/2014 | Park | G06F 3/0482 | 345/173 |
| 2014/0189593 A1* | 7/2014 | Kurita | G06F 3/0483 | 715/835 |
| 2014/0218343 A1* | 8/2014 | Hicks | G06F 3/04883 | 345/179 |
| 2014/0253464 A1* | 9/2014 | Hicks | G06F 3/0488 | 345/173 |
| 2014/0253468 A1* | 9/2014 | Havilio | G06F 3/03545 | 345/173 |
| 2014/0253470 A1* | 9/2014 | Havilio | G06F 3/0488 | 345/173 |
| 2014/0253521 A1* | 9/2014 | Hicks | G06F 3/03545 | 345/179 |
| 2014/0267062 A1* | 9/2014 | Nakao | G06F 1/3215 | 345/173 |
| 2014/0267184 A1* | 9/2014 | Bathiche | G06F 1/3259 | 345/179 |
| 2014/0306909 A1* | 10/2014 | Pedersen | G06F 3/03545 | 345/173 |
| 2014/0306929 A1* | 10/2014 | Huang | G06F 3/04162 | 345/174 |
| 2014/0340318 A1* | 11/2014 | Stringer | G06F 3/044 | 345/173 |
| 2014/0344740 A1* | 11/2014 | Kaula | G16H 50/50 | 715/771 |
| 2014/0368473 A1* | 12/2014 | Chang | G06F 3/04162 | 345/179 |
| 2015/0301647 A1* | 10/2015 | Sato | G06F 3/044 | 345/174 |
| 2015/0332107 A1* | 11/2015 | Paniaras | G06F 3/04842 | 715/765 |
| 2016/0139693 A9* | 5/2016 | Fujii | G06F 3/0442 | 345/173 |
| 2016/0259521 A1* | 9/2016 | Tokutake | G06F 3/0421 | |
| 2019/0317620 A1 | 10/2019 | Missig et al. | | |
| 2020/0192568 A1* | 6/2020 | Goertz | G06F 21/31 | |
| 2021/0325997 A1 | 10/2021 | Missig et al. | | |
| 2023/0326174 A1* | 10/2023 | Chen | G06V 10/25 | 382/167 |

OTHER PUBLICATIONS

Song et al., "Grips and Gestures on a Multi-Touch Pen," research.microsoft.com/pubs/ . . . /gripsandgestures%20mtpen-chi201>, May 7-12, 2011, 10 pages.

Office Action, dated Jun. 30, 2016, received in U.S. Appl. No. 14/616,532 (7266), 29 pages.

Notice of Allowance, dated Jan. 23, U.S. Appl. No. 14/616,532 (7266), 11 pages.

Office Action, dated Mar. 9, 2018, received in U.S. Appl. No. 15/607,186 (7499), 15 pages.

Final Office Action, dated Sep. 12, 2018, received in U.S. Appl. No. 15/607,186 (7499), 17 pages.

Notice of Allowance, dated Feb. 11, 2019, received in U.S. Appl. No. 15/607,186 (7499), 9 pages.

Notice of Allowance, dated Jun. 18, 2019, received in U.S. Appl. No. 16/445,108 (7635), 16 pages.

Notice of Allowance, dated Jun. 21, 2021, received in U.S. Appl. No. 17/353,722 (7807), 17 pages.

* cited by examiner

DYNAMIC USER INTERFACE ADAPTABLE TO MULTIPLE INPUT TOOLS

RELATED APPLICATIONS

This application is a continuation of U.S. application Ser. No. 17/353,722, filed Jun. 21, 2021, which is a continuation of U.S. application Ser. No. 16/445,108, filed Jun. 18, 2019, now U.S. Pat. No. 11,042,250, which is a continuation of U.S. application Ser. No. 15/607,186, filed May 26, 2017, now U.S. Pat. No. 10,324,549, which is a continuation of U.S. application Ser. No. 14/616,532, filed Feb. 6, 2015, now U.S. Pat. No. 9,665,206, which is a continuation of U.S. application Ser. No. 14/030,682, filed Sep. 18, 2013, abandoned, each of which is hereby incorporated by reference in its entirety.

BACKGROUND

The present disclosure relates generally to a user interface and in particular to a user interface element that dynamically adapts to different user input tools.

Recent years have seen a proliferation of touchscreen-based computing devices, including mobile phones, tablets, and hybrid computers operable as a tablet or a laptop. These devices generally incorporate a display area overlaid with a touch-sensitive overlay (e.g., a resistive or capacitive overlay). The display can present a user interface incorporating various input and/or output elements, such as virtual buttons and video, still-image, or text presentations. The overlay can detect contact by an object such as a finger or stylus or the like and can determine the portion of the display that was contacted. Based on the contacted portion of the display and the currently presented interface, the device can infer a user request or instruction.

SUMMARY

A graphical user interface element displayed by a computing device can be dynamically adapted to different user input tools, for example a fingertip or a stylus.

The following detailed description together with the accompanying drawings will provide a better understanding of the nature and advantages of the present invention.

DETAILED DESCRIPTION

Certain embodiments of the present invention relate to computing devices, such as mobile computing devices, that have touchscreen user interfaces operable by different input tools, such as a user's finger or a stylus held by the user. These different input tools can contact the touchscreen with different-sized contact areas. For example, a stylus can have a fine point comparable to a pen or pencil, while a fingertip is comparatively blunt. Consequently, the stylus can contact a smaller area of the touchscreen than a finger. Further, a user may find different gestures more or less comfortable depending on the input tool. For example, while twisting or rotating a finger while keeping the fingertip in contact with the screen may be uncomfortable, twisting or rotating a stylus may feel more natural and comfortable. For reasons such as these, a user input interface that is optimized for fingertip contact may not be optimal for other input tools such as a stylus, and vice versa.

Accordingly, certain embodiments provide graphical user interfaces and/or graphical user interface elements that can be dynamically and automatically altered depending on the type of input tool in use. The type of input tool can be automatically detected, and the detection process can be transparent to the user. For example, a stylus can have a touch sensor built into its body, covering an area where a user's hand is expected to contact the stylus while in use. In response to detecting contact with the touch sensor, the stylus can communicate to the computing device that the stylus is in an "active" state, and the computing device can present a graphical user interface with input elements adapted for stylus input. When the touch sensor of the stylus ceases to detect contact, the stylus can communicate to the computing device that the stylus is in an "idle" state, and the computing device can present a graphical user interface with input elements adapted for fingertip input.

Examples of adaptations for a particular input tool can include changing the number of input elements displayed on the screen (e.g., fewer and larger input elements for fingertip input than for stylus input), changing the arrangement of input elements (e.g., elements placed closer together for stylus input), changing a control-adjustment paradigm (e.g., slider buttons for fingertip input and rotation-based controls such as a virtual set-screw for stylus input), changing the manner of input (e.g., stroke-based input for stylus versus virtual keyboard for fingertip input), and so on. Additional examples are described below.

Figure 1:
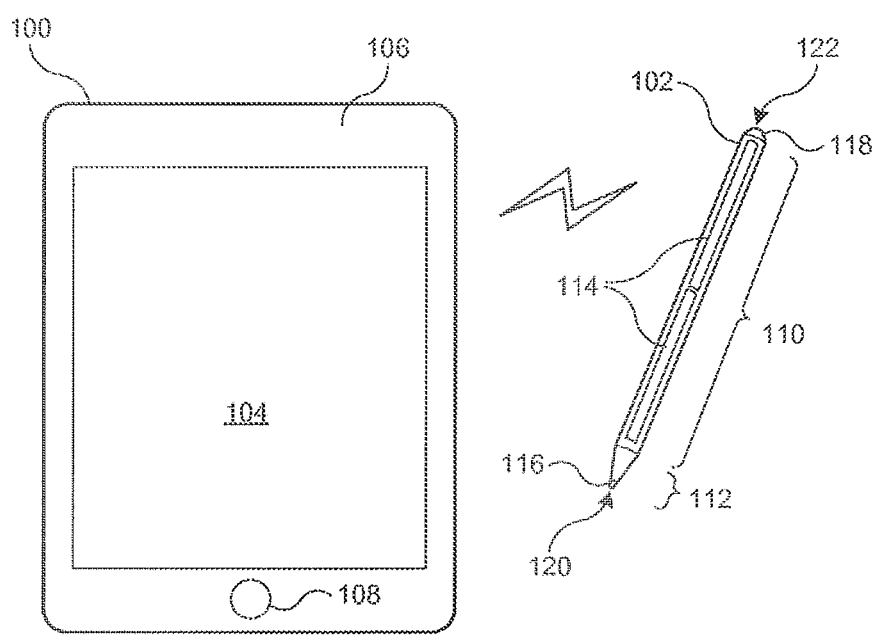
FIG. 1 shows a computing device and a stylus according to an embodiment of the present invention.

FIG. 1 shows a mobile computing device 100 (a tablet computer in this example) and a stylus 102 according to an embodiment of the present invention. Computing device 100 can include a touchscreen display area 104 with a surrounding bezel 106. A control button 108 can be provided, e.g., to return touchscreen display area 104 to a "home" screen. Stylus 102 can include a barrel portion 110 and a tip portion 112. Various sensors can be disposed on or within stylus 102. Shown by way of example are touch sensors 114 disposed along barrel portion 110. In some embodiments, touch sensors 114 can be capacitive sensors that respond to contact with human skin by varying a capacitance; electronic circuits inside stylus 102 can sense the change in capacitance and thereby detect contact. Other types of touch sensors can also be used, such as pressure sensors that can detect pressure of the user's grip on the stylus, proximity sensors that can detect patterns of proximity consistent with being in a user's hand, and so on; one or more types of touch sensors can be used in any combination. Touch sensors 114 can be distributed such that it is highly likely that whenever a user picks up stylus 102 with intent to use it, at least one sensor 114 will register the contact. Stylus 102 can but need not be capable of distinguishing contact with different touch sensors 114.

Other sensors disposed on stylus 102 can include contact sensors 116, 118 disposed at the tip end 120 and/or the reverse end 122. Sensors 116 and 118 can be configured to detect proximity to and/or contact with computing device 100. In some embodiments, tip end 120 can be tapered as shown and can come to a point or nearly to a point (with a small cross sectional area relative to a finger), while reverse end 122 can be blunt or slightly rounded, making the two ends visually distinguishable. The particular size and shape of tip end 120 and/or reverse end 122 can be modified as desired. In embodiments described herein, it is assumed that tip end 120 provides a contact area with touchscreen display 104 that is measurably smaller than an average human finger; however, this is not required. Sensors 116, 118 can be any sensors usable to detect or confirm contact with touchscreen display 104. In some embodiments, sensors 116 and 118 can modify a surface capacitance of tip end 120 or rear end 122 on contact; if touchscreen display 104 is a capacitive touchscreen, this change can be sensed directly by computing device 100.

Stylus 102 can be an active electronic device capable of communicating signals from its sensors (e.g., sensors 114, 116, 118) to computing device 100. Wired or wireless communication channels can be used; specific examples are described below with reference to FIG. 2. Computing device 100 can use the sensor information transmitted from stylus 102 together with its own state information to adapt its behavior based on use of stylus 102. For example, stylus 102 can detect when it is picked up by a user, e.g., using touch sensors 114. When stylus 102 is picked up, it can transmit a signal to computing device 100 indicating that stylus 102 is now in an "active" state. (As used herein, an "active" state of the stylus refers to a state in which the sensors of the stylus indicate that it is being held by a user, while an "idle" state of the stylus refers to a state in which the sensors of the stylus do not indicate that it is being held by a user.) In response to this signal, computing device 100 can adapt its interface accordingly, for instance by modifying the size, spacing, and/or number of visible input elements to better make use of the relatively small contact area of tip portion 120 of stylus 102.

It will be appreciated that the computing device and stylus of FIG. 1 are illustrative and that variations and modifications are possible. For example, while a tablet computer is shown, computing devices can vary in size, form factor, and capabilities; other types of computing devices can include mobile phones, laptop computers, hybrid computers that incorporate a combination of touchscreen and keyboard interfaces, and so on. Computing devices can be but need not be portable. Computing devices can also vary as to capabilities; for example, various computing devices may or may not provide mobile voice and/or data services (e.g., via a cellular network), Internet connectivity (e.g., via Wi-Fi or other wireless or wired interfaces or via a cellular data network), Global Positioning System services, media player capability, personal data management services (e.g., calendar, contacts, notes, reminders), and/or the ability to run various application programs including third-party application programs to provide a wide range of user interactions (e.g., interactive drawing, word processing, spreadsheets, calculators, information storage and retrieval, games, activity monitoring, document display and reading, etc.).

A stylus can have any size and form factor. In some embodiments, a stylus can be suitably sized and shaped to be held comfortably in a human hand; however, it is not required that the stylus be handheld or even that a user of the stylus have hands. As long the stylus has sensors able to detect when it is or is not being held or actively used by a user, active and idle states as described herein can be distinguished. For example, in some embodiments, a stylus can include internal accelerometers (or other motion sensors) in addition to or instead of touch sensors; whether the stylus is being held by a user can be determined by comparing accelerometer data to patterns of motions expected when a stylus is being held by a person (including, e.g., small vibration due to the natural unsteadiness of human hands).

Figure 2:
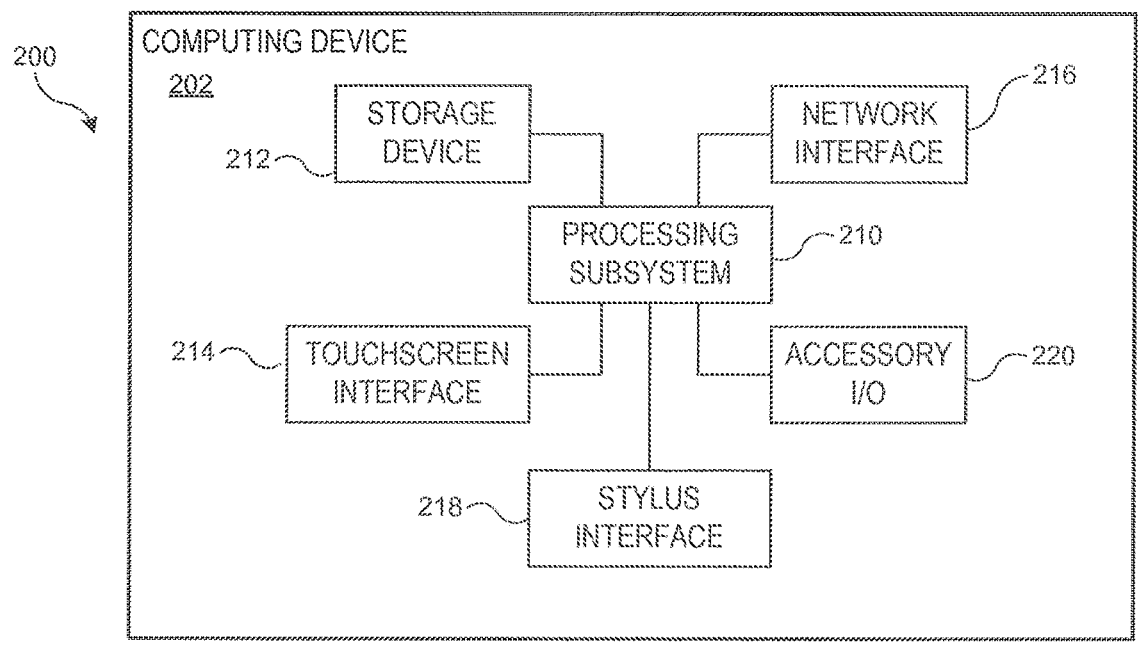
FIG. 2 is a simplified block diagram of a system including a computing device and a stylus according to an embodiment of the present invention.
Figure 2:
Figure 2:
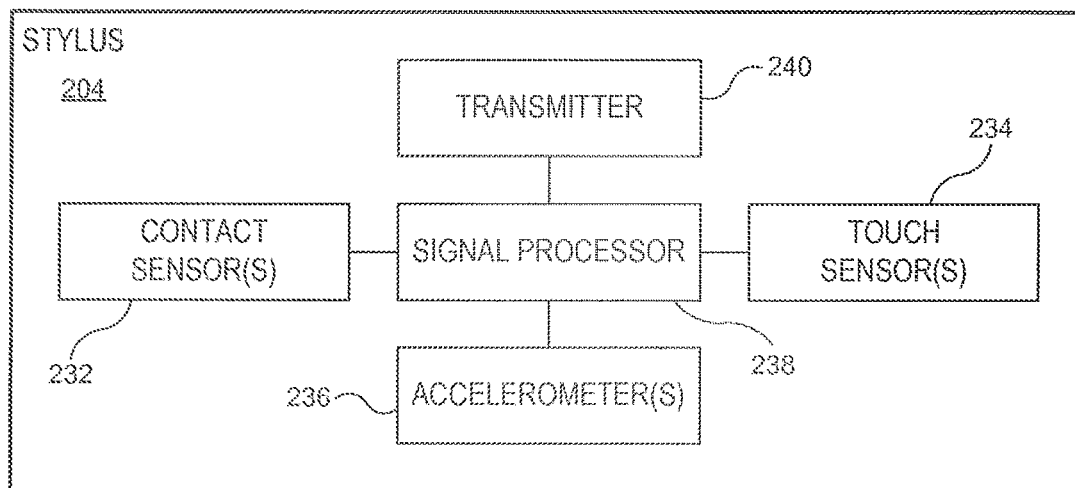

FIG. 2 is a simplified block diagram of a system 200 including computing device 202 and stylus 204 according to an embodiment of the present invention. In this embodiment, computing device 202 (e.g., implementing computing device 100 of FIG. 1) can provide computing, communication and/or media playback capability. Computing device 200 can include processing subsystem 210, storage device 212, touchscreen interface 214, network interface 216, stylus interface 218, and accessory input/output (I/O) interface 220. Computing device 202 can also include other components (not explicitly shown) such as a battery, power controllers, and other components operable to provide various enhanced capabilities.

Storage device 212 can be implemented, e.g., using disk, flash memory, or any other non-transitory storage medium, or a combination of media, and can include volatile and/or non-volatile media. In some embodiments, storage device 212 can store data objects such as audio files, video files, image or artwork files, information about a user's contacts (names, addresses, phone numbers, etc.), information about a user's scheduled appointments and events, notes, and/or other types of information or data files. In some embodiments, storage device 212 can also store one or more application programs to be executed by processing subsystem 210 (e.g., video game programs, personal information management programs, media playback programs, etc.) and/or one or more operating system programs or other firmware to implement and support various device-level capabilities including generation of graphical user interfaces and processing of user input.

Touchscreen interface 214 can be implemented, e.g., as an LCD display with a touch-sensitive overlay such as a resistive or capacitive overlay and can be operable using various input tools such as fingertip, stylus, and so on. In some embodiments, computing device 202 can also include other user input devices such as a touch pad, scroll wheel, click wheel, dial, button, switch, keyboard, keypad, microphone, or the like, and/or output devices such as indicator lights, speakers, headphone jacks, or the like, together with supporting electronics (e.g., digital-to-analog or analog-to-digital converters, signal processors, or the like). A user can operate touchscreen interface 214 (and any other input devices that may be present) to interact with computing device 202.

Processing subsystem 210 can be implemented as one or more integrated circuits, e.g., one or more single-core or multi-core microprocessors or microcontrollers, examples of which are known in the art. In operation, processing subsystem 210 can control the operation of computing device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage device 212.

Network interface 216 can provide voice and/or data communication capability for computing device 202. In some embodiments network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), components for short-range wireless networking (e.g., using Bluetooth standards), GPS receiver components, and/or other components. In some embodiments network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

Stylus interface 218 can receive communications from stylus 204 and/or send communications to stylus 204. For example, stylus interface 218 can use a wireless communication protocol such as Bluetooth or Bluetooth LE that provides for serial data transfer. A serial protocol with a universe of messages and message formats can be defined. For instance, depending on implementation, stylus 204 can send any or all of the following messages: a "stylus active" message indicating that stylus 204 is in the active state; a "stylus idle" message indicating that stylus 204 is in the idle state; and/or a message containing sensor data from one or more sensors of stylus 204. Other messages or combinations of messages can also be supported.

Accessory I/O interface 220 can allow computing device 202 to communicate with various accessories. For example, accessory I/O interface 220 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 220 can support wireless communication (e.g., via Wi-Fi, Bluetooth, or other wireless transports). The same wireless transceiver hardware as network interface 216 and/or stylus interface 218 can be used for both networking and accessory communication. Additionally, in some embodiments, accessory I/O interface 220 can include a connector as well as supporting circuitry. In some instances, stylus 204 can connect via accessory I/O interface 220, and a separate stylus interface is not required.

Through suitable programming, processing subsystem 210 can provide various functionality for computing device 202. For example, processing subsystem 210 can execute operating system code and/or application code to render a graphical user interface ("GUI") image that includes one or more user-operable input elements (e.g., virtual buttons, knobs, sliders, set-screws, data-entry boxes, etc.). Processing subsystem 210 can also receive and interpret messages from stylus 204 via stylus interface 208 and can use the messages to modify the rendering of the GUI image based on the received messages. For instance, as described below, the number, size, arrangement, and/or control type of input elements can be modified. Processing subsystem 210 can also execute other programs to control other functions of computing device 202, including application programs that may be stored in storage device 212.

Stylus 204 can include various sensors such as contact sensors 232, touch sensors 234, and accelerometer(s) 236; a signal processor 238; and a transmitter (or transceiver) 240. Stylus 204 can also include other components (not explicitly shown) such as a battery, power controllers, and other components operable to provide various enhanced capabilities.

Contact sensor(s) 232 (e.g., implementing sensors 116, 118 of FIG. 1) can be configured to detect contact of specific areas of stylus 204 with a touchscreen display of computing device 202 and to generate corresponding electronic signals. For example, resistive or capacitive contact sensors can be used. In some embodiments, contact sensors 232 can generate a signal (e.g., a change in resistance or capacitance) that the touchscreen display of computing device 202 can detect as contact.

Touch sensor(s) 234 (e.g., implementing sensors 114 of FIG. 1) can be configured to detect touching of side surfaces of stylus 204 (e.g., barrel portion as shown in FIG. 1.) and to generate corresponding electronic signals. Any type of sensor can be used, including capacitive sensors, resistive sensors, pressure-based sensors or the like.

Accelerometer(s) 236 can be configured to detect motion of stylus 204 and generate corresponding electronic signals. A three-axis MEMS-based accelerometer or the like can be used.

Transmitter 240 can be configured to send messages from stylus 204 to stylus interface 218 of computing device 202. In the example shown, transmitter 240 and stylus interface 218 support wireless communication, and transmitter 240 can include a combination of hardware (e.g., driver circuits, antennas, modulators/demodulators, encoders/decoders, and other analog and/or digital signal processing circuits) and software components. In addition or instead, transmitter 240 can provide a physical connection to computing device 202 and can include a connector, a cable, drivers, and other analog and/or digital signal processing circuits. In some embodiments, transmitter 240 can provide one-way communication from stylus 204 to computing device 202; in other embodiments, a two-way transceiver can be used, and stylus 204 can both receive messages from computing device 202 and send messages to computing device 202.

Signal processor 238 can detect electronic signals from the various sensors including contact sensor(s) 232, touch sensor(s) 234, and/or accelerometer 236 and can generate messages to be communicated to computing device 202 via transmitter 240. In various embodiments, the messages can include a representation of the electronic sensor signals and/or other information derived from the electronic sensor signals such as whether the stylus is in the active or idle state, whether (and what portion of) the stylus is in contact with the touchscreen interface of computing device 202, and so on. Status messages such as battery status information, stylus identifying information, and the like, can also be communicated using transmitter 240.

In some embodiments, stylus 204 can implement a wireless communication protocol (e.g., using transmitter 240) that provides proximity detection based on signal strength. For example, using Bluetooth LE, stylus 204 and computing device 202 can establish a pairing, and stylus 204 (or computing device 202) can use the strength of Bluetooth LE signals from computing device 202 (or stylus 204) to estimate proximity between the devices. Signals from contact sensor(s) 232 in combination with the proximity estimate can be used to determine whether contact with the touchscreen has occurred.

It will be appreciated that the system configurations and components described herein are illustrative and that variations and modifications are possible. The computing device and/or stylus may have other capabilities not specifically described herein (e.g., mobile phone, global positioning system (GPS), broadband data communication, Internet connectivity, etc.).

Further, while the computing device and stylus are described herein with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
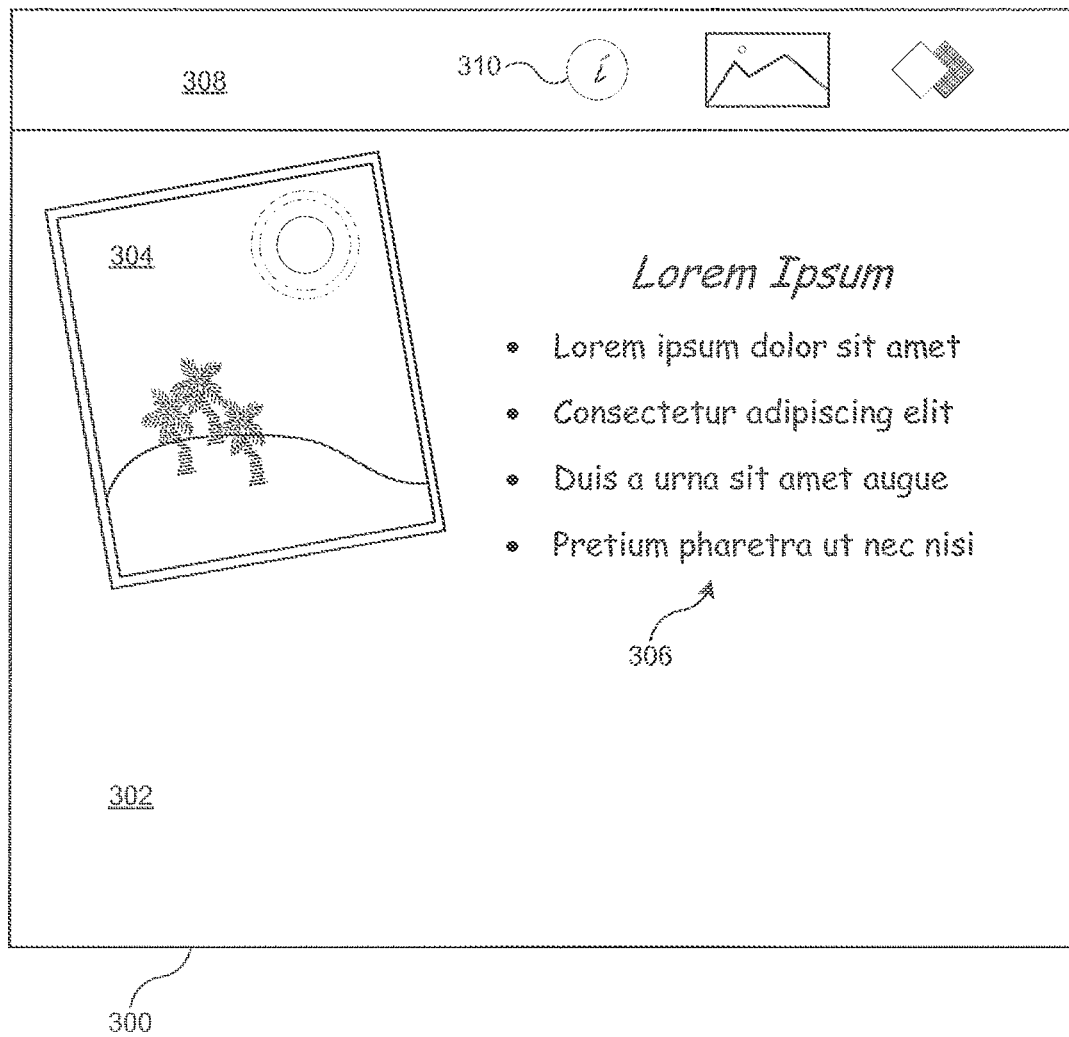
FIG. 3 illustrates a user interface screen that can be presented by a computing device according to an embodiment of the present invention.

FIG. 3 illustrates one example of a user interface screen 300 that can be presented by a computing device (e.g., computing device 100 of FIG. 1) according to an embodiment of the present invention. In this example, user interface screen 300 supports creation and editing of a presentation that can incorporate text, images, and other media. A presentation page is rendered in main section 302; in this example, the presentation page includes an image 304 and accompanying text 306. A control section 308 can provide various user operable input elements that the user can select (e.g., by touching) to modify the presentation page. For example, when image 304 is highlighted, selecting control button 310 can cause an image-formatting menu to be displayed; when text 306 is highlighted, selecting control 308 can cause a text-formatting menu to be displayed. In some embodiments, user interface screen 300 can be presented when the stylus is in idle mode, and controls in section 308 and/or menus that are displayed can be optimized for fingertip operation.

Figure 4:
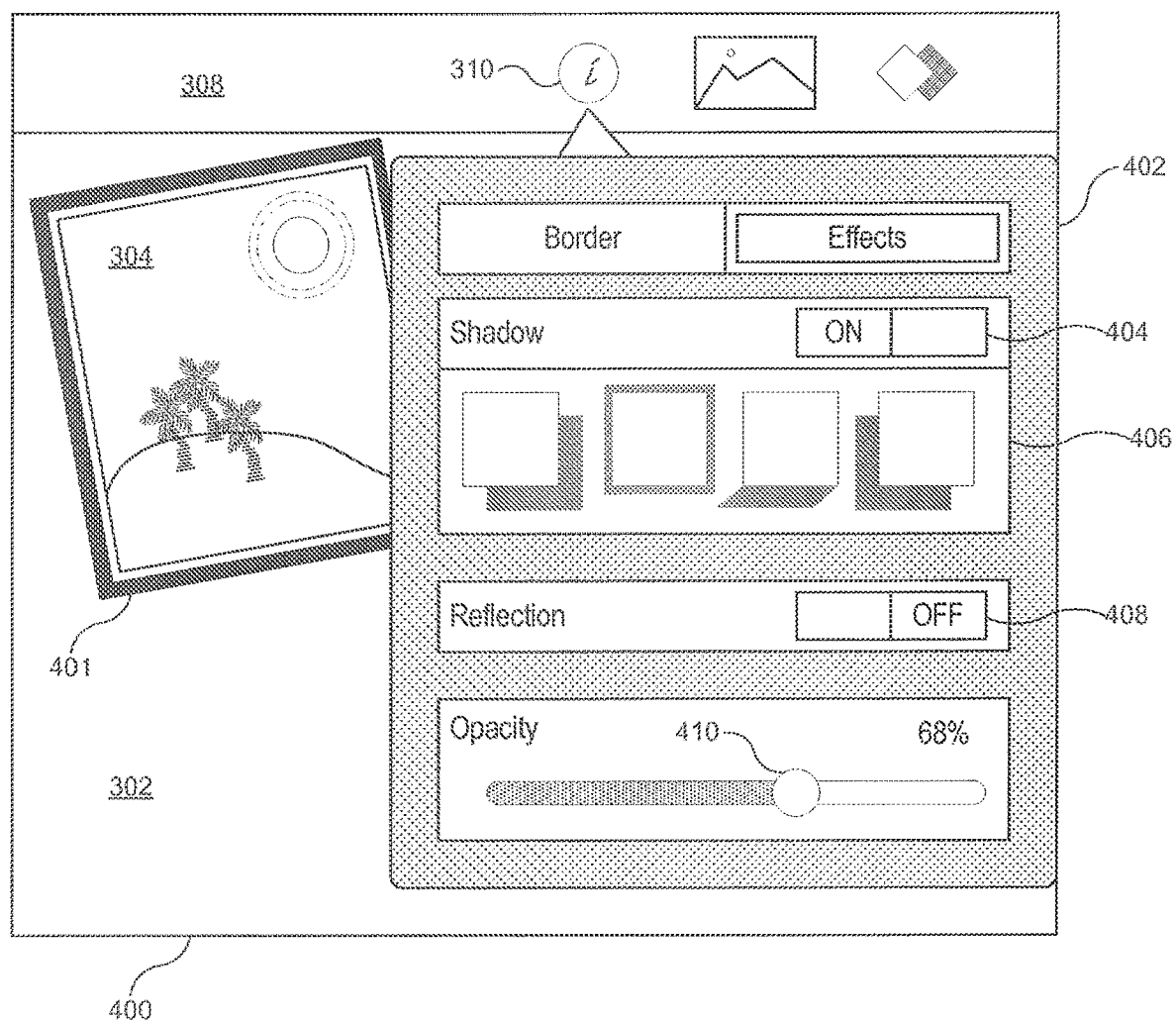
FIG. 4 illustrates another user interface screen that can be presented by a computing device according to an embodiment of the present invention.

FIG. 4 illustrates an example of a user interface screen 400 that can be presented when a user, presented with user interface screen 300 of FIG. 3, highlights image 304 (as shown by highlight outline 401) and selects button 310. In response, computing device 100 can present an image formatting menu 402 as an overlay on top of a portion of presentation area 302. In this example, menu 402 provides various options for display effects that can be associated with image 304. For instance, the user can select, using virtual switch 404, whether image 304 should cast a virtual shadow on the presentation page; if shadowing is turned on, then section 406 can present selectable options for the type and orientation of the shadow. Similarly, the user can select, using virtual switch 408, whether a reflection should be provided; if reflection is turned on (not shown in this example), options for the reflection can be provided. Slider 410 can be moved laterally to set the desired opacity from 0% (fully transparent) to 100% (fully opaque).

It should be noted that menu 402 can be displayed when the stylus is in the idle state, and the various control elements presented in menu 402 can be adapted to be easily operated by a user's finger making gestures on a touchscreen, e.g., by making the controls of appropriate size for typical fingertips to unambiguously touch one control and by making the operational gestures correspond to actions a user's fingers can comfortably perform. For instance, a user can slide a finger across slider 410 to adjust its position to a desired location. A user can tap a finger on the appropriate location to select a shadow option from section 406.

Figure 5:
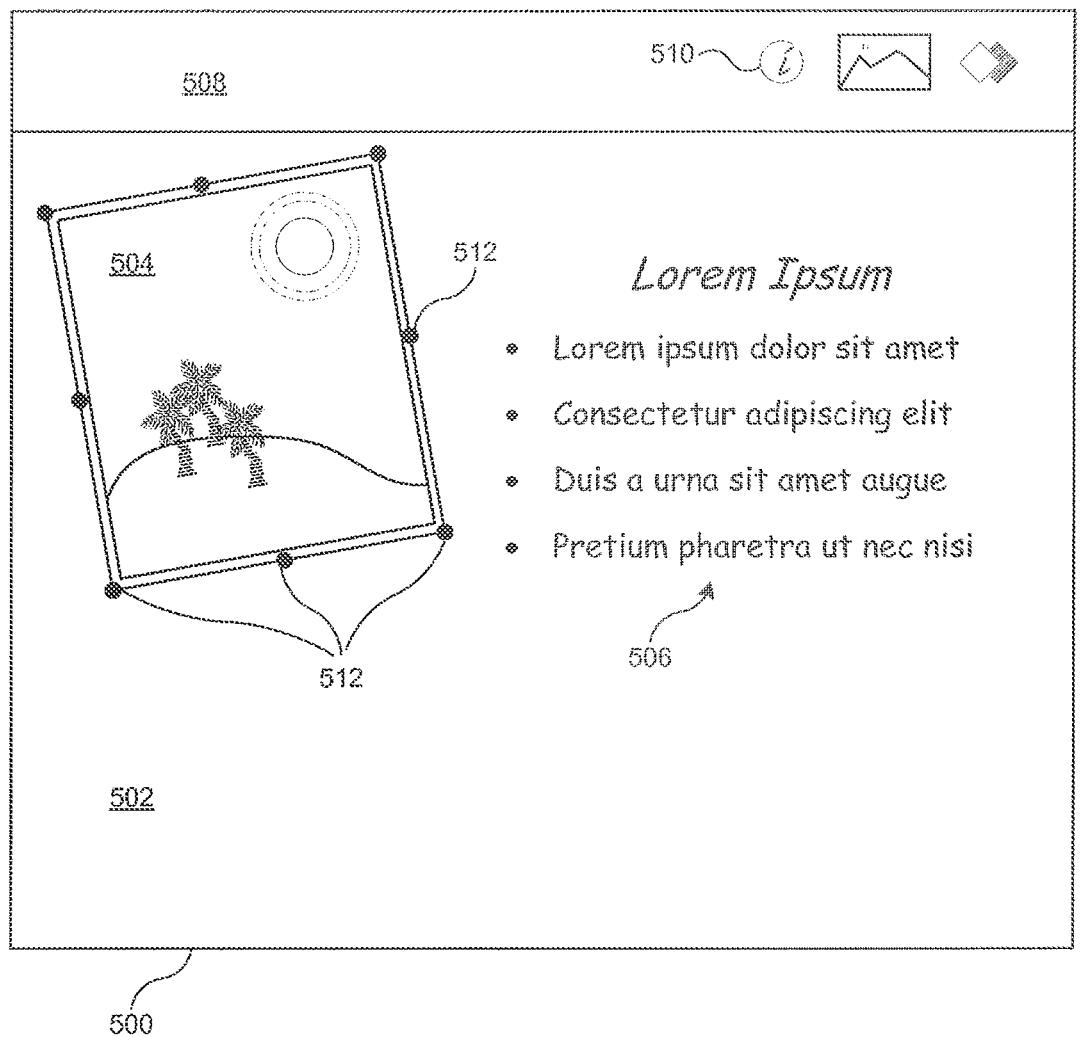
FIG. 5 illustrates another user interface screen that can be presented by a computing device according to an embodiment of the present invention.

A different user interface can be deployed if the stylus is in the active state. For example, FIG. 5 illustrates one example of a user interface screen 500 that can be presented by a computing device (e.g., computing device 100 of FIG. 1) according to an embodiment of the present invention. User interface screen 500, similarly to user interface screen 300, supports creation and editing of a presentation that can incorporate text, images, and other media. Screens 500 and 300 can be implemented in the same application, with selection between them being based on whether a stylus in the active state is present. Similarly, to interface screen 300, a presentation page is rendered in main section 502; in this example, the presentation page includes an image 504 and accompanying text 506. A control section 508 can provide various user operable controls that the user can select (e.g., by touching) to modify the presentation page. For example, when image 504 is highlighted, selecting control button 510 can cause an image-formatting menu to be displayed; when text 506 is highlighted, selecting control 508 can cause a text-formatting menu to be displayed.

In some embodiments, user interface screen 500 can be presented when the stylus is in active mode, and controls in section 508 and/or menus that are displayed can be adapted for stylus operation. For instance, if a stylus is expected to have a smaller contact area than a finger, control elements in section 508 can be smaller and/or more closely spaced than controls in section 308 of FIG. 3 without making it difficult for the stylus to unambiguously touch the desired control element. In addition, user interface screen 500 can present different control elements and/or or a different combination of control elements from screen 300. For example, in user interface screen 500, when a user selects image 504, control handles 512 can be displayed to facilitate precise resizing or other adjustments to image 504 using stylus 102.

Figure 6:
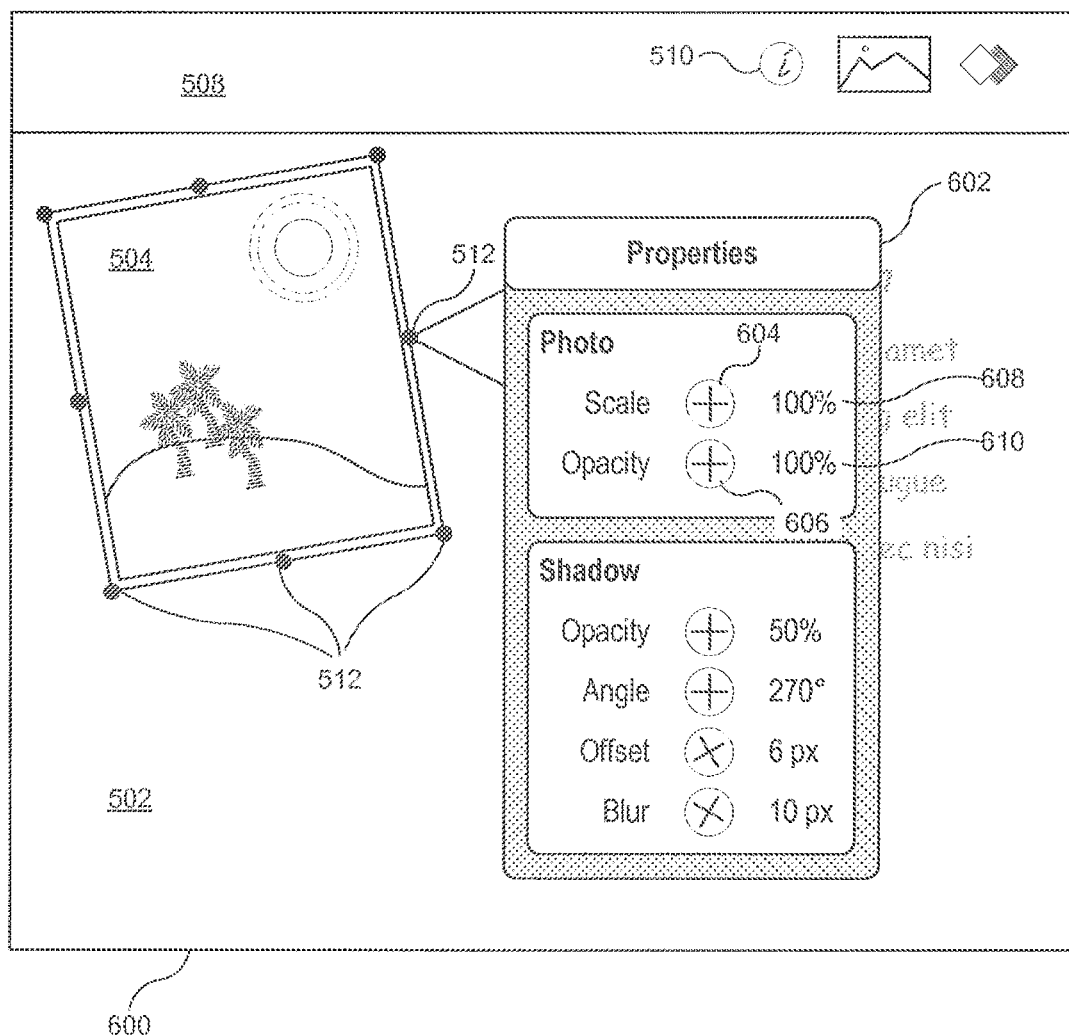
FIG. 6 illustrates another user interface screen that can be presented by a computing device according to an embodiment of the present invention.

In addition, control handles 512 can be used to invoke image properties menus. By way of example, FIG. 6 shows an example of a user interface screen 600 that can be presented when a user, presented with user interface screen 500 of FIG. 5, selects a control handle 512, e.g., by tapping with stylus 102. Interface screen 600 includes an image formatting menu 602 that can appear as an overlay on top of a portion of presentation area 502. In this example, menu 602 provides various options for display effects that can be associated with image 504. For example, the user can adjust the size, opacity, and shadow properties. In this example, a user can adjust each property using a corresponding virtual rotational control (e.g., set-screw 604 to adjust photo size, set-screw 606 to adjust photo opacity, and so on).

A virtual set-screw (e.g., set-screw 604 or set-screw 606) can be operated similarly to a real set-screw that is adjustable by inserting and twisting a screwdriver. In the case of a virtual set-screw, stylus 102 can act as the "screwdriver." While the use of a set-screw as a control paradigm may visually cue the user that the control element is operable by rotation, other rotational control elements can be displayed, and in some instances, the option of rotational control need not be visually indicated (examples of implied rotational controls are described below).

Rotational control can be implemented in any user interface, provided that rotational movement of stylus 102 about its longitudinal axis can be detected. For example, as described above with reference to FIG. 2, an implementation of stylus 102 can include accelerometer(s) 236, which can be configured to detect rotational movement about the longitudinal axis, and contact sensor(s) 232, which can be configured to detect contact of the tip of stylus 102 with touchscreen 104. If rotational motion about the longitudinal axis is detected while the stylus tip is in contact with the touchscreen, stylus 102 can transmit a signal indicating rotational motion to computing device 100. The signal can indicate the amount and direction of rotation. Computing device 100 can determine, e.g., based on the position of the contact location of stylus 102 on touchscreen 104, which rotational control is being operated and interpret the input accordingly, e.g., adjusting image size if set-screw 604 is operated, adjusting image opacity if set-screw 606 is operated, and so on.

In some embodiments, the adjustment can be applied in real time in response to the rotational movement of the stylus. For example, there can be a mapping between the change in the setting and the amount of rotation detected. In some instances, the mapping can also take into account the speed of rotation (e.g., adjusting a value by larger amounts for a given amount of rotation if the rotation is made at high speed and by smaller amounts if the rotation is made at low speed).

In addition, value indicators 608, 610 (which indicate the current value for the corresponding setting) can be updated in real time. In some embodiments, a set-screw or other rotational control element can provide a fine control over the values of various settings.

Figure 7:
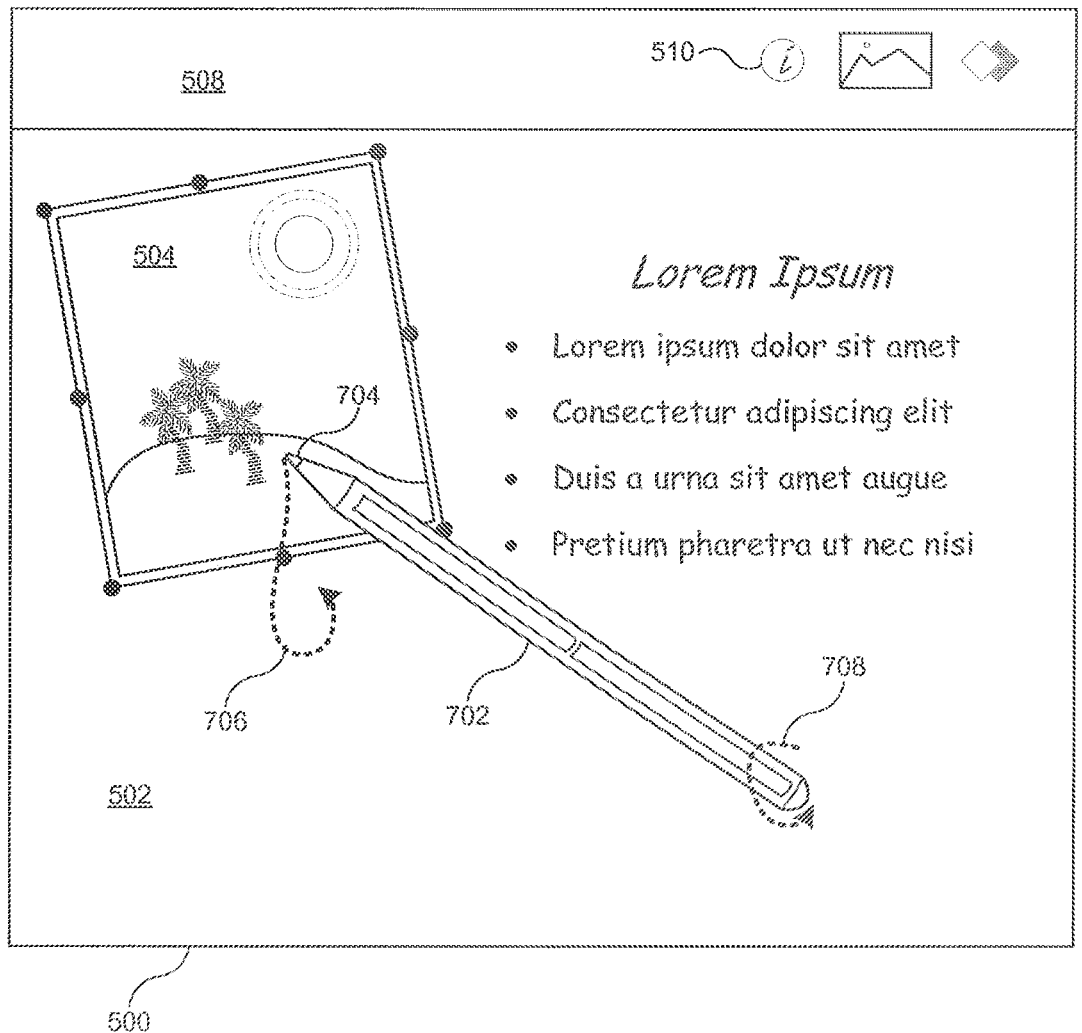
FIG. 7 illustrates another user interface screen that can be presented by a computing device according to an embodiment of the present invention.

In some embodiments, when the stylus is in the active state and in contact with the surface, concurrent rotational and translational motions of the stylus can be detected and used to concurrently control or adjust different properties of a displayed object. For example, referring to interface screen 500 of FIG. 5, a stylus can be used to adjust the position and rotation angle of image 504. FIG. 7 shows a stylus 702 having a tip 704 in contact with image 504. Dashed line 706 indicates a translational motion path for stylus tip 704, and dashed line 708 indicates a rotational motion path of stylus 702 about its longitudinal axis. A user holding stylus 702 (the user's hand is not shown in order to avoid obscuring other elements) can concurrently or successively execute paths 706 and 708.

Figure 8:
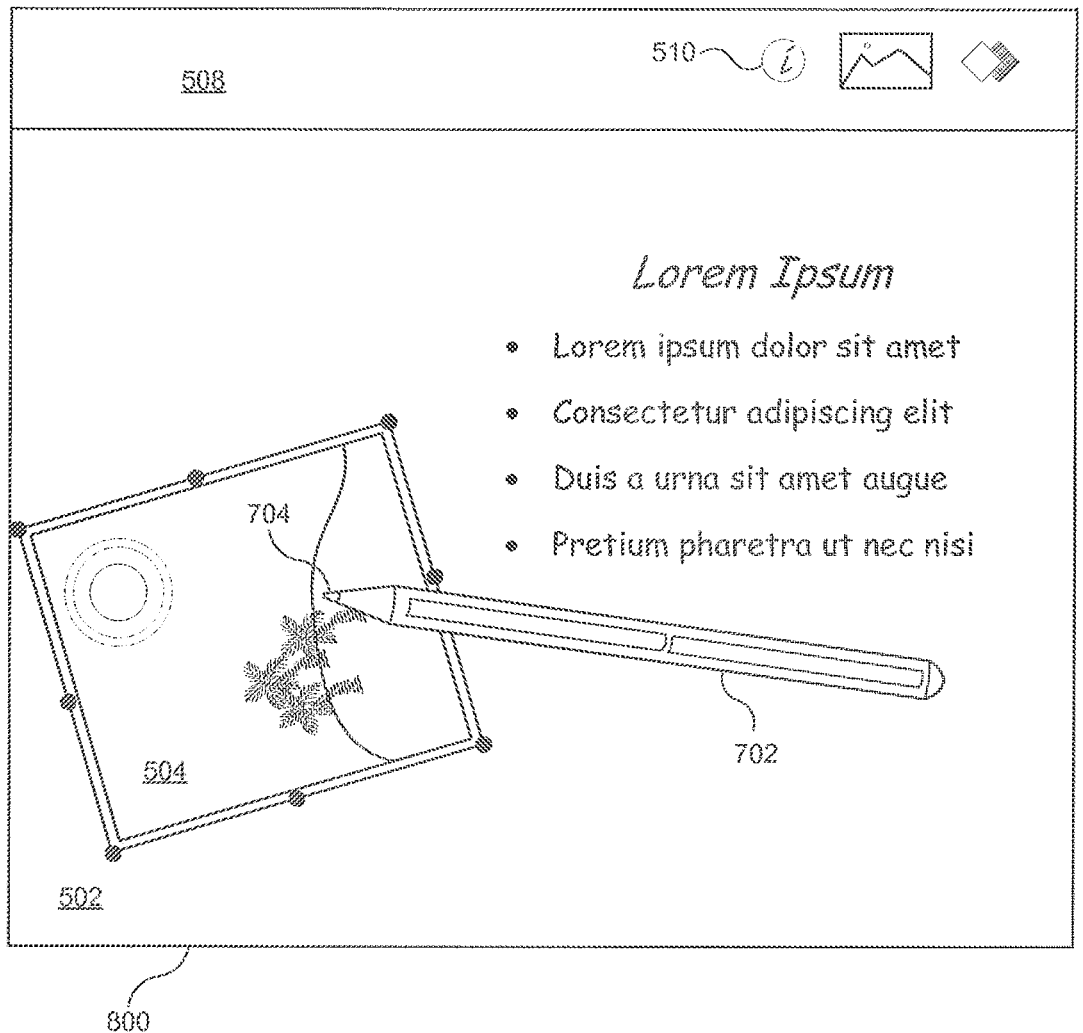
FIG. 8 illustrates another user interface screen that can be presented by a computing device according to an embodiment of the present invention.

FIG. 8 shows an example of a user interface screen 800 that can be presented as a result of executing paths 706 and 708. Image 504 is translated across the presentation page shown in main section 502 based on path 706 such that the same point in image 504 remains in contact with stylus tip 704. Image 504 is also rotated based on rotation path 708. Thus, the user can adjust the position and rotation angle of a displayed object. In this example, the option to rotate image 504 by rotating stylus 702 is not visually indicated in the user interface. Some embodiments can provide visual cues. For instance, when stylus tip 704 contacts a point within image 504, a rotational knob or arrows or other indicator that the rotation angle of image 504 can be changed might be presented.

Figure 9:
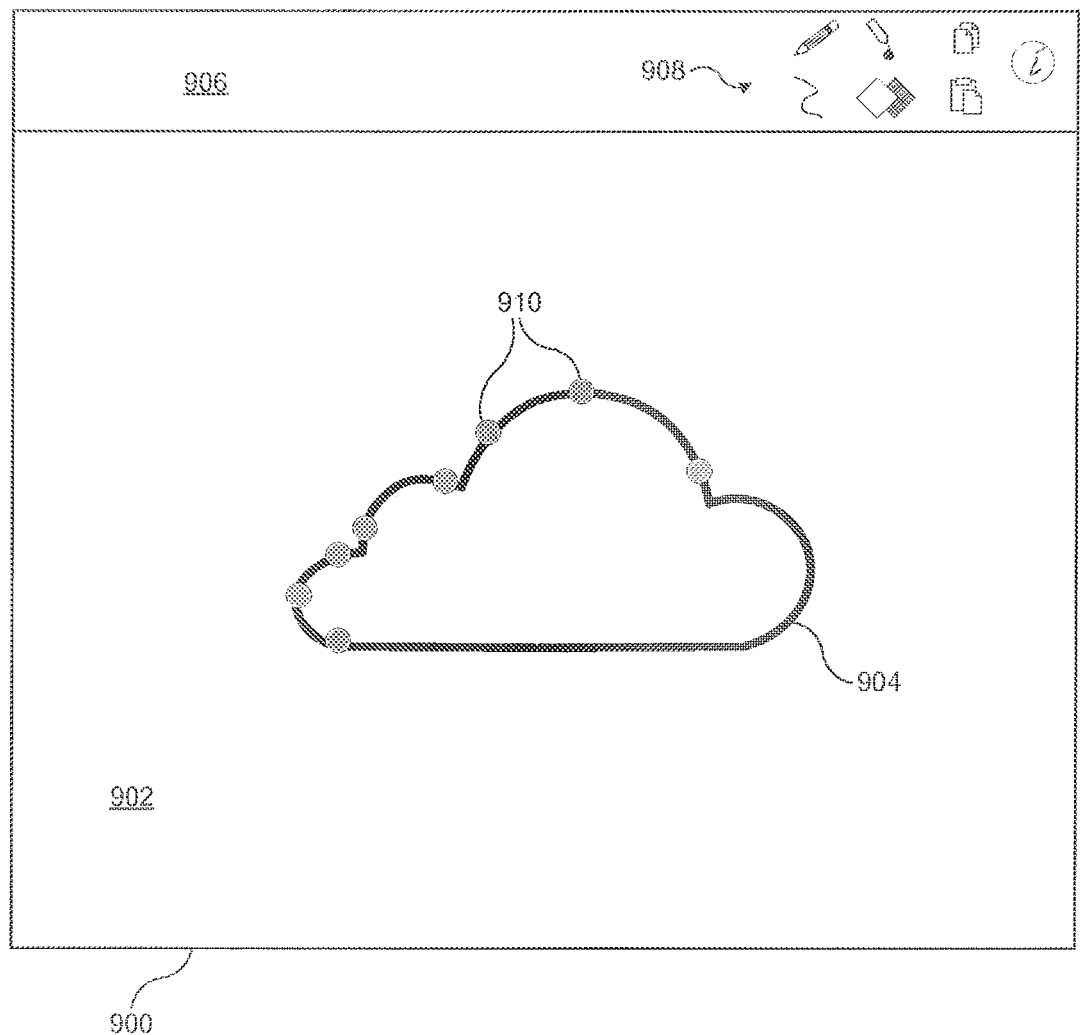
FIG. 9 illustrates another user interface screen that can be presented by a computing device according to an embodiment of the present invention.

As another example, a user can use simultaneous translation and rotation of a stylus to fine-tune a drawn object. FIG. 9 illustrates an example of a user interface screen 900 for a drawing program that can be presented by a computing device (e.g., computing device 100 of FIG. 1) according to an embodiment of the present invention. Interface screen 900 can provide a main drawing area 902, in which a user can draw objects such as object 904. A control section 906 can provide various user-operable controls 908, e.g., to select a drawing tool (e.g., different line properties, paintbrush properties, or the like), to perform functions such as filling an area with a color or pattern, to copy and paste objects into a drawing, and so on.

In this example, object 904 is a curved object with a path defined using Bezier curves. Bezier curves are defined by a series of control points 910, each of which has an associated tangent line (not shown in FIG. 9).

In certain embodiments of the present invention, translational motion of a stylus can be used to adjust the position of a control point of a Bezier curve while rotational motion can be used to adjust the orientation angle of the tangent line.

Figure 10:
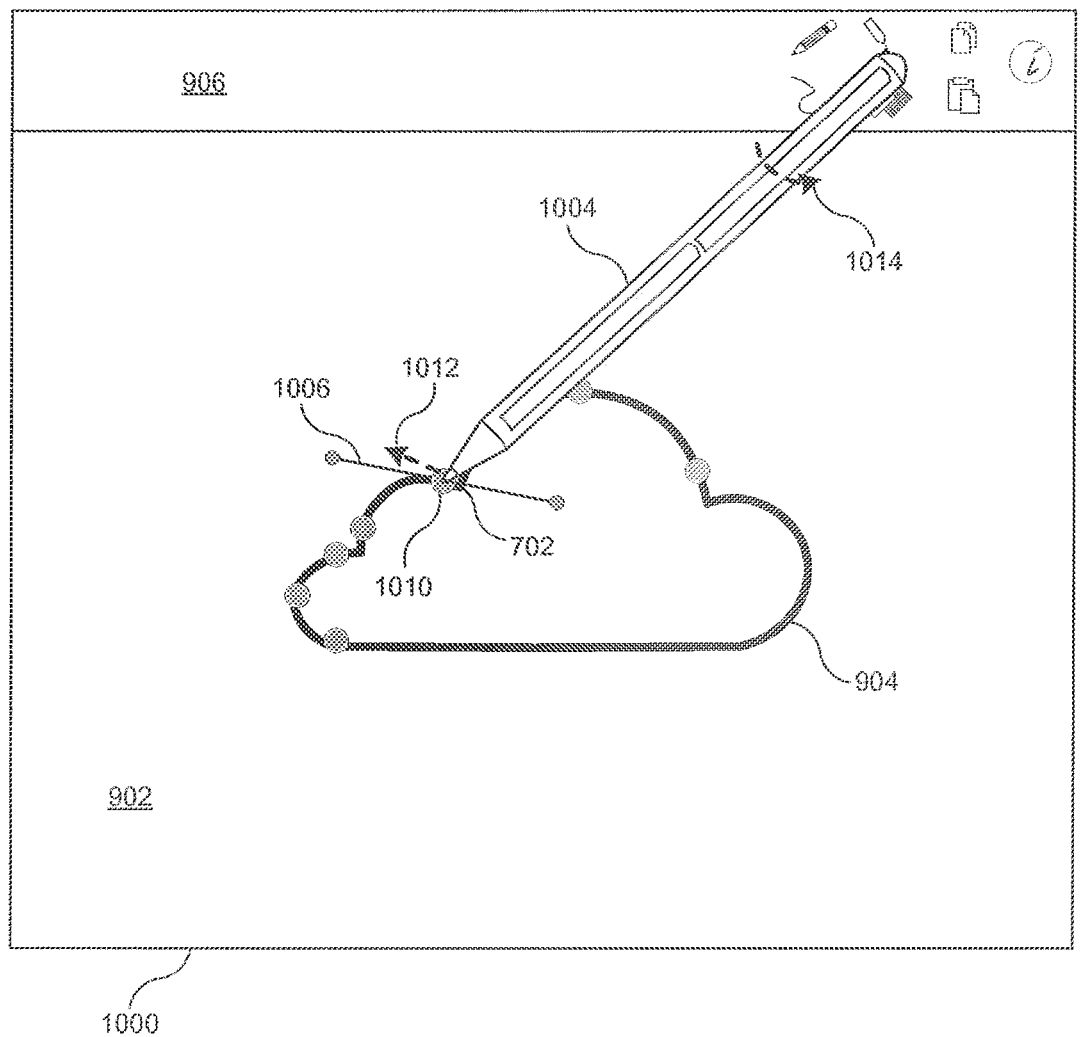
FIG. 10 illustrates another user interface screen that can be presented by a computing device according to an embodiment of the present invention.

For instance, FIG. 10 shows an example of a user interface screen 1000 that can be presented when tip 1002 of stylus 1004 is near to or in contact with a particular control point 1010. In this example, tangent line 1006 can appear in main drawing area 902. Translational motion of tip 1002 can adjust the position of control point 1010, while rotational motion of stylus 1004 about its longitudinal axis can adjust the angle of tangent line 1006. By way of illustration, dashed line 1012 indicates a translational motion path for stylus tip 1002, and dashed line 1014 indicates a rotational motion path of stylus 1004 about its longitudinal axis. A user holding stylus 1004 (the user's hand is not shown in order to avoid obscuring other elements) can concurrently or successively execute paths 1012 and 1014.

Figure 11:
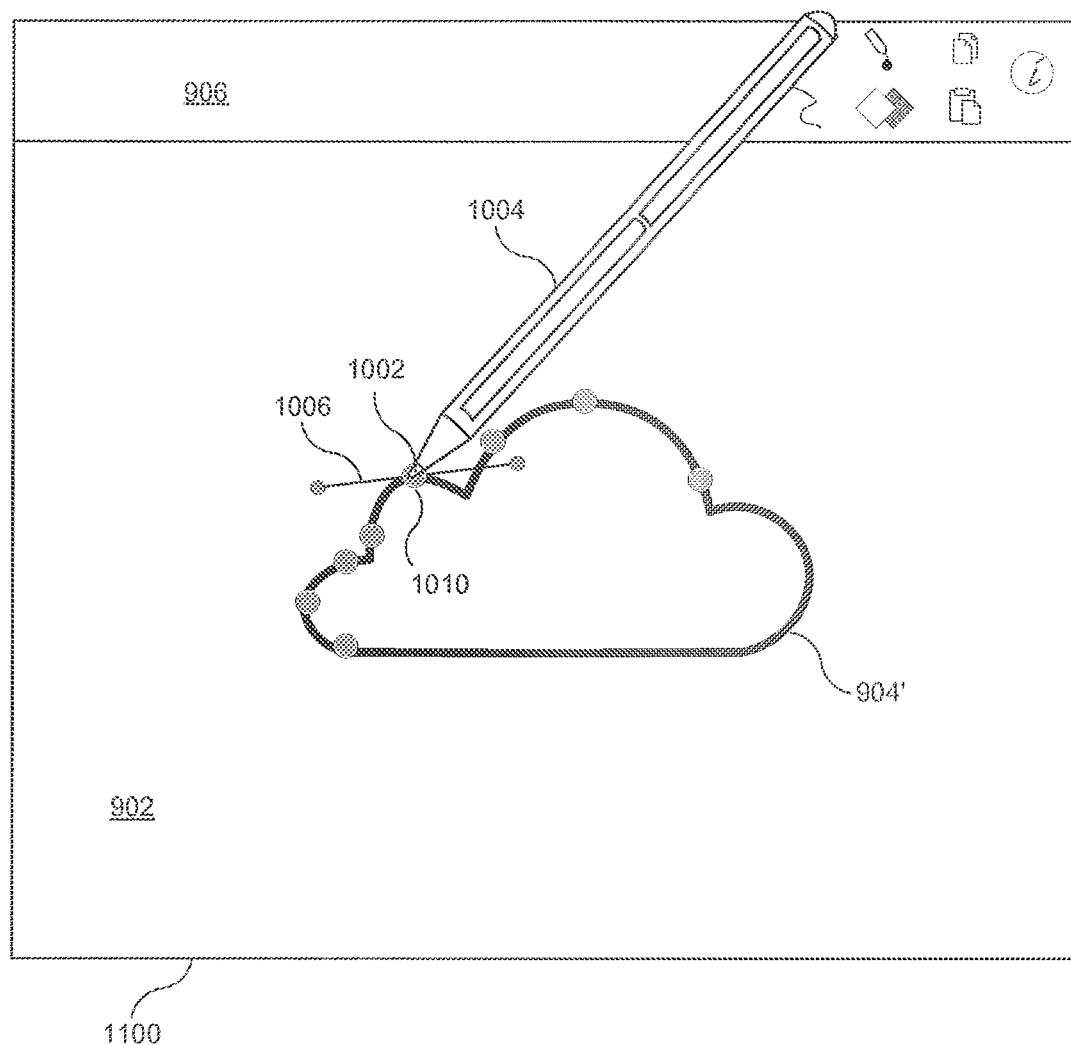
FIG. 11 illustrates another user interface screen that can be presented by a computing device according to an embodiment of the present invention.

FIG. 11 shows an example of a user interface screen 1100 that can be presented as a result of executing paths 1012 and 1014. As a result of executing translational path 1012, control point 1010 is moved to a new position. As a result of executing rotational path 1014, the angle of tangent line 1006 is changed. Consequently, object 904' has a somewhat different shape from original object 904 of FIG. 9. The adjustment can be made in real-time, and the user can translate and rotate stylus 1004 to modify the shape of object 904 as desired. This provides an intuitive interface for fine-tuning curved lines in drawings.

As the examples of FIGS. 7-11 show, when a graphical user interface is displayed in the stylus mode, a computing device such as computing device 100 can concurrently detect translational motion of a contact point of a tip of the stylus with a surface of the touch-sensitive display and rotational motion of the stylus about a longitudinal axis. In response, one property of a displayed object can be adjusted based on the translational motion, while a second property of the displayed object can be concurrently adjusted based on the rotational motion.

It will be appreciated that the user interface screens of FIGS. 3-11 are illustrative and that variations and modifications are possible. A user interface screen can include any number and arrangement of input elements. Input elements can be used for a variety of purposes, including editing displayed objects, defining properties of displayed objects (shadows, opacity, sizes, fonts, colors, orientations, etc.), defining objects to be displayed (e.g., entering text, selecting images or other content, drawing) specifying operations to perform (e.g., media playback operation such as play/pause, previous track), adjusting properties of output devices (e.g., volume control, brightness control), retrieving and presenting content (e.g., based on a user selecting hyperlinks in a web browser), invoking functionality (e.g., launching an application), and any other purpose for which a user may interact with a computing device having a touchscreen display.

The same application can present different user interface screens, e.g., depending on whether the stylus is in the active state or the idle state. In some instances, an application can dynamically switch to a different interface screen if the state of the stylus changes. For instance, a presentation editing application can present interface screen 300 for as long as the stylus is in an idle state and switch to interface screen 500 if the stylus enters the active state.

Figure 12:
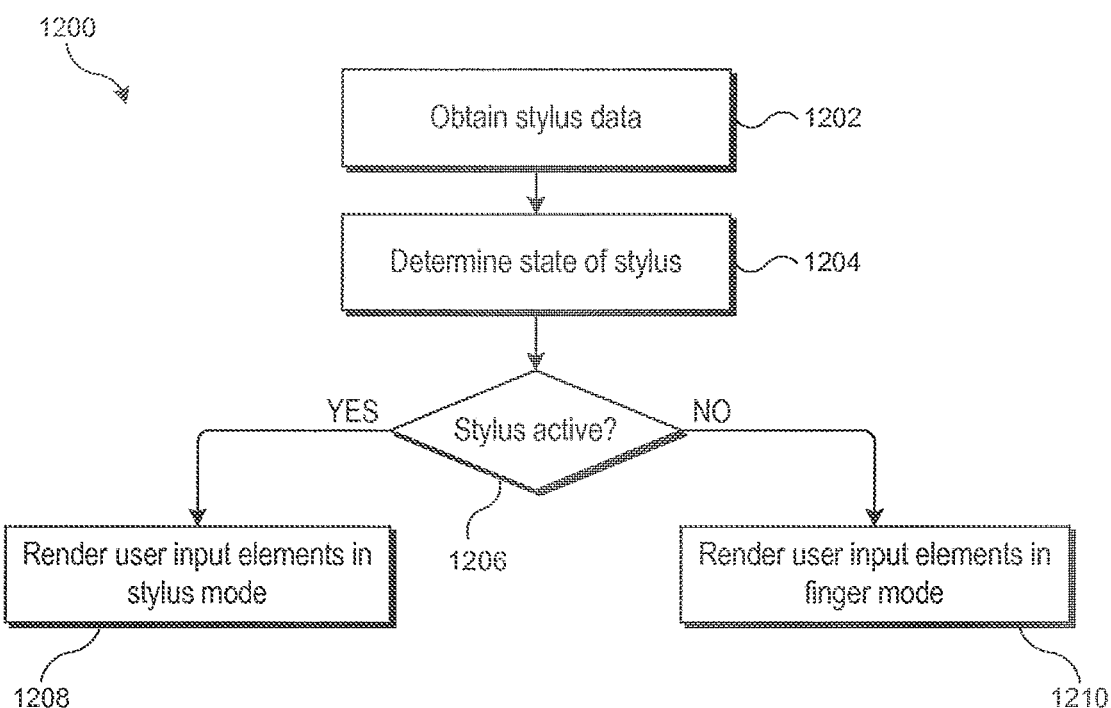
FIG. 12 is a flow diagram of a process for rendering a user interface according to an embodiment of the present invention.

FIG. 12 is a flow diagram of a process 1200 for rendering a user interface according to an embodiment of the present invention. Process 1200 can be implemented, e.g., in an application executing on computing device 100 of FIG. 1.

At block 1202, process 1200 can obtain stylus data. For example, as described above, stylus 102 can send a signal to computing device 100, and process 1200 can receive this signal. At block 1204, process 1200 can determine the state of the stylus (e.g., active or idle). For example, as described above, the signal sent by stylus 102 can include a message indicating the stylus state, which stylus 102 can determine based on sensor readings. As another example, stylus 102 can send a signal that includes the sensor data, and process 1200 or another process on computing device 100 (e.g., an operating system process) can determine the state of the stylus based on the received signal.

At block 1206, a determination is made as to whether stylus 102 is in the active state. If so, then at block 1208, the user interface can be rendered in a "stylus mode." For example, the code for rendering the user interface can include conditional statements that can cause certain input elements to be rendered in a different manner (e.g., slider versus set-screw) or to be rendered or not rendered (e.g., control handles 512 of FIG. 5) depending on whether the stylus is in the active state.

If, at block 1206, stylus 102 is not in the active state (e.g., if stylus 102 is in the idle state), then at block 1210, the user interface can be rendered in a "finger mode." For example, as noted above, the code for rendering the user interface can include conditional statements governing how input elements are rendered, and block 1210 can include executing the same code as block 1208, with the difference in condition resulting in a different rendering.

The difference between user interfaces rendered at blocks 1208 and 1210 can include a difference in the rendering of at least one user-operable input element of the user interface. For instance, the stylus mode (block 1208) can provide a rendering of the element that is based on an expectation that a stylus will be used to operate the element, while the finger mode (block 1210) can provide a rendering of the element that is based on an expectation that a finger will be used to operate the element. Thus, for example, an element can be rendered at a smaller size in the stylus mode than in the finger mode. An element can be rendered for a different type of operation in the stylus mode as opposed to the finger mode (e.g., an adjustable control can be rendered as a set-screw in the stylus mode and as a slider in the finger mode). The renderings can also differ in the number and placement of user-operable input elements.

It is to be understood that rendering a user interface or user interface element in a mode associated with a particular input tool (e.g., a stylus mode associated with a stylus) need not preclude the use of other input tools (e.g., a finger) to interact with the interface or element. Accordingly, a user might hold the stylus in one hand and touch the screen with fingers of the other hand, or the user might hold the stylus in a manner that leaves one or more fingers available to touch the screen, or one user might be holding the stylus while another user touches the screen with fingers. In such instances, the graphical user interface can remain in stylus mode for as long as the user continues to hold the stylus. Alternatively, depending on how the touch sensors of the stylus are arranged, it can be possible to determine whether the contact with the user's hand corresponds to holding the stylus in an orientation associated with actual use (e.g., a contact pattern associated with holding a pencil or pen) or a non-use orientation (e.g., wedged between two fingers), and the mode to be used for rendering the interface can be selected accordingly.

In some instances, a stylus might not be present. For instance, in embodiments described above, a computing device can detect the presence of a stylus based on transmissions from the stylus; if no transmissions are received, then the stylus can be considered to be absent. This case can be handled, e.g., by assuming the idle state for the stylus in the absence of transmissions. As another example, in some embodiments, the stylus and the computing device can establish a pairing (e.g., a Bluetooth pairing), and the computing device can ignore any status-related messages from any stylus with which it is not paired. Thus, a user's experience need not be affected by the mere presence of a stylus in the vicinity; a particular device would enter the stylus mode only if it is paired with a stylus that is in the active state.

It will be appreciated that process 1200 is illustrative and that variations and modifications are possible. Steps described as sequential may be executed in parallel, order of steps may be varied, and steps may be modified, combined, added or omitted. For instance, the determination of the state of the stylus can be made by the computing device or the stylus.

Figure 13:
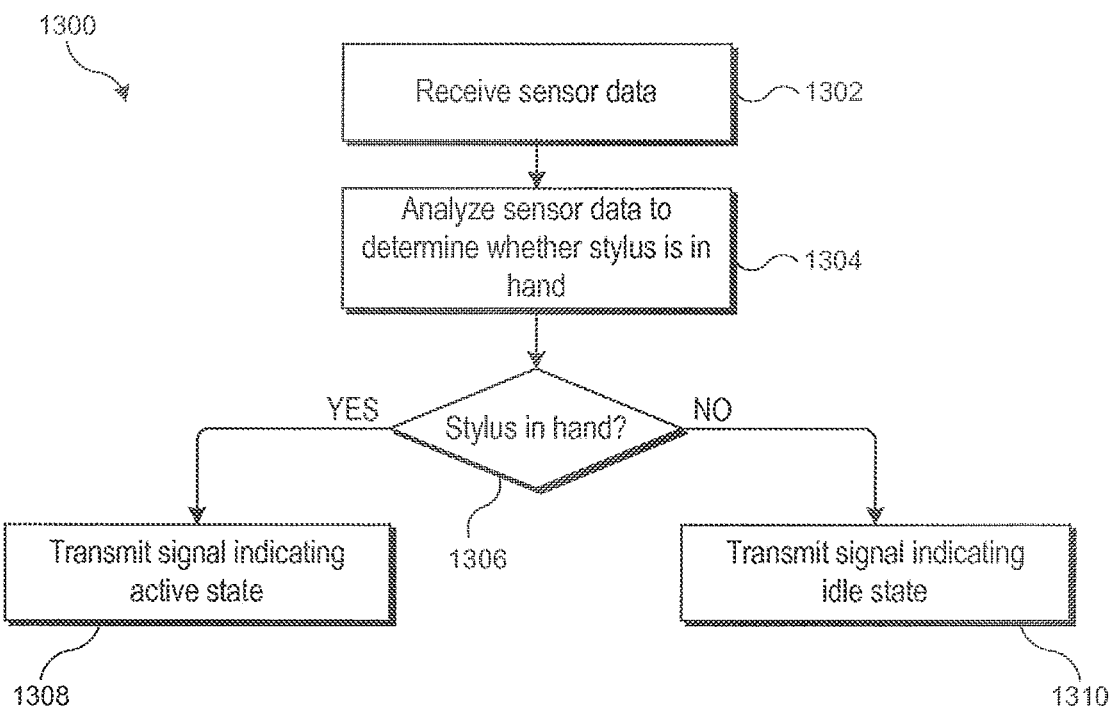
FIG. 13 is a flow diagram of a process for determining stylus state according to an embodiment of the present invention

FIG. 13 is a flow diagram of a process 1300 for determining stylus state according to an embodiment of the present invention. Process 1300 can be implemented, e.g., in stylus 102 of FIG. 1. As described above with reference to FIG. 2, an implementation of stylus 102 can include control logic to interpret signals from touch sensors (e.g., capacitive and/or pressure-based touch sensors) and/or motion sensors to determine whether it is being held by a user.

At block 1302, the control logic of stylus 102 can receive sensor data (e.g., from touch sensors 114 and/or internal motion sensors). At block 1304, the sensor data can be analyzed to determine whether stylus 102 is in a user's hand. For example, touch sensor data can be analyzed to detect a pattern of contact areas consistent with a human hand. In some embodiments, the analysis can include comparing the pattern of contact areas to patterns associated with a human hand in a particular pose (e.g., holding a pencil or pen in order to write). As another example, motion sensor data can be used to detect movement consistent with being held by a person as opposed to being at rest on a surface. Such distinctions can be based on amplitude and/or frequency analysis of the accelerometer data. In some embodiments, a combination of touch sensor and motion sensor data can be used.

At block 1306, if it is determined that stylus 102 is in a user's hand, then at block 1308, stylus 102 can transmit a signal to computing device 100 indicating that it is in the active state. If, at block 1306, stylus 102 is not determined to be in a user's hand, then at block 1310, stylus 102 can transmit a signal to computing device 100 indicating that it is in the idle state.

Process 1300 can be performed iteratively, e.g., at regular intervals such as every 0.1 seconds or every 0.01 seconds, or every 0.001 seconds, and stylus 102 can periodically report its state. In some embodiments, transmission of a signal at block 1308 or 1310 occurs only if the state has changed since the last execution of process 1300. Where transmission occurs on a state change, computing device 100 can assume that the state is unchanged until the next transmission. In some embodiments, computing device 100 can send a message to stylus 102 requesting the current state, and process 1300 can be executed in response to such a request. For example, computing device 100 might send a state-requesting message if it has not received a state message from stylus 102 within some "heartbeat" period, or computing device 100 might send a state-requesting message if it is preparing to render a new user interface or otherwise update the displayed image.

It is to be understood that process 1300 can be but need not be performed by the stylus. In some embodiments, stylus 102 can transmit its sensor data to computing device 100 without analysis, and computing device 100 can perform the analysis and determine whether the stylus is in the active or idle state.

As noted above, stylus state can be determined based on sensors that respond to touching of particular surfaces of the stylus (e.g., a barrel portion in the case of an elongate stylus as shown in FIG. 1) and/or motion sensors such as accelerometers. Any type and combination of sensor data can be used. For instance, accelerometers or other motion sensors can be used in the absence of touch sensors, touch sensors can be used in the absence of motion sensors, or a combination of motion sensor data and touch sensor data can be used. In some instances, where both accelerometer data and touch sensor data are used, a signal indicating that the stylus is being held by a user from either sensor suffices to trigger the active state; this can be useful, e.g., if a user holds the stylus using a prosthetic device that the touch sensor does not reliably register.

While the invention has been described with respect to specific embodiments, one skilled in the art will recognize that numerous modifications are possible. The computing device and the stylus can vary as to form factor, size and components. Any computing device having a touchscreen display can be used. A stylus can include any tool that can operate a touchscreen display of a computing device by direct contact or near-contact and that is capable of communicating sensor data and/or state information to the computing device. In the examples shown above, a stylus communicates wirelessly with the computing device, e.g., using Bluetooth or Bluetooth LE or the like. However, a wired connection can be implemented. For example, a stylus can be connected into a cable that plugs into a receptacle connector in the housing of a computing device; the cable can be sufficiently long and flexible to avoid interfering with use of the computing device. Where a wired connection is used, the stylus can draw power from the computing device or from its own internal power source. In the case of a wireless connection, the stylus can have its own internal power source; in some instances, it may be possible to physically connect the stylus to the computing device for recharging of the stylus, and in some instances, the stylus may support both wired and wireless communication interfaces.

In some embodiments, the stylus can include one or more user-operable input controls such as buttons, switches, dials or the like, and communication from the stylus to the computing device can include messages indicating the status and/or operation of any input controls that may be present on the stylus.

In embodiments described above, a computing device can use the active or idle state of a stylus to affect rendering of a user interface. This state information can also be used for other purposes. For example, if the stylus is in the idle state, the stylus can also reduce its power consumption, e.g., by powering down some of its sensors and discontinuing or reducing transmissions to the computing device. At least one sensor can remain operational in order to detect a possible transition to the active state, and this event can result in waking up other sensors that can confirm the transition. As another example, if the user picks up the stylus while the computing device is in a low-power state (e.g., with its touchscreen display turned off), the stylus can notify the computing device, and the computing device can transition to a ready-to-use state, e.g., turning on its touchscreen display.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable storage media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   at an electronic device that is in communication with a display generation component and an input object:

displaying, via the display generation component, an object having a plurality of control points displayed on portions of the object;
detecting a first portion of an input by the input object;
in response to detecting the first portion of the input by the input object:
in accordance with a determination that a location of the first portion of the input by the input object corresponds to a first control point of the plurality of control points, displaying a first tangent line corresponding to the first control point, wherein the first tangent line is displayed at a respective angle;
while displaying the first tangent line, detecting a second portion of the input by the input object, including detecting a rotational movement in a first direction along a longitudinal axis of the input object;
in response to detecting the second portion of the input by the input object:
displaying the first tangent line at a first updated angle, wherein the first updated angle is selected in accordance with the rotational movement in the first direction along the longitudinal axis of the input object and the first updated angle is different from the respective angle; and
changing a visual appearance of the object based on the first updated angle.

2. The method of claim 1, further including:
in accordance with a determination that the location of the first portion of the input by the input object corresponds to a second control point of the plurality of control points, displaying a second tangent line corresponding to the second control point.

3. The method of claim 1, further including:
while the first tangent line corresponding to the first control point is displayed, detecting a third portion of the input by the input object, including detecting a rotational movement in a second direction along the longitudinal axis of the input object; and
in response to detecting the third portion of the input by the input object:
displaying the first tangent line at a second updated angle, wherein the second updated angle is selected in accordance with the rotational movement in the second direction along the longitudinal axis of the input object and the second updated angle is different from the first updated angle.

4. The method of claim 1, wherein,
the first control point is displayed at a first location, and the method includes:
while the location of the first portion of the input by the input object corresponds to the first control point of the plurality of control points, detecting a second input by the input object including detecting a translational movement of the input object in a third direction;
in response to detecting the second input by the input object:
changing location of the first control point from the first location to a second location different from the first location; and
changing the visual appearance of the object based on the second location of the first control point.

5. The method of claim 1, wherein the input object is a stylus.

6. An electronic device, comprising:
one or more processors;
memory; and
one or more programs, wherein the one or more programs are stored in the memory and configured to be executed by the one or more processors, the one or more programs including instructions for:
displaying, via a display generation component in communication with the electronic device, an object having a plurality of control points displayed on portions of the object;
detecting a first portion of an input by an input object;
in response to detecting the first portion of the input by the input object:
in accordance with a determination that a location of the first portion of the input by the input object corresponds to a first control point of the plurality of control points, displaying a first tangent line corresponding to the first control point, wherein the first tangent line is displayed at a respective angle;
while displaying the first tangent line, detecting a second portion of the input by the input object, including detecting a rotational movement in a first direction along a longitudinal axis of the input object;
in response to detecting the second portion of the input by the input object:
displaying the first tangent line at a first updated angle, wherein the first updated angle is selected in accordance with the rotational movement in the first direction along the longitudinal axis of the input object and the first updated angle is different from the respective angle; and
changing a visual appearance of the object based on the first updated angle.

7. The electronic device of claim 6, wherein the one or more programs include instructions for:
in accordance with a determination that the location of the first portion of the input by the input object corresponds to a second control point of the plurality of control points, displaying a second tangent line corresponding to the second control point.

8. The electronic device of claim 6, wherein the one or more programs include instructions for:
while the first tangent line corresponding to the first control point is displayed, detecting a third portion of the input by the input object, including detecting a rotational movement in a second direction along the longitudinal axis of the input object; and
in response to detecting the third portion of the input by the input object:
displaying the first tangent line at a second updated angle, wherein the second updated angle is selected in accordance with the rotational movement in the second direction along the longitudinal axis of the input object and the second updated angle is different from the first updated angle.

9. The electronic device of claim 6, wherein,
the first control point is displayed at a first location, and the one or more programs include instructions for:
while the location of the first portion of the input by the input object corresponds to the first control point of the plurality of control points, detecting a second input by the input object including detecting a translational movement of the input object in a third direction;
in response to detecting the second input by the input object:

changing location of the first control point from the first location to a second location different from the first location; and changing the visual appearance of the object based on the second location of the first control point.

10. The electronic device of claim 6, wherein the input object is a stylus.

11. A non-transitory computer readable storage medium storing one or more programs, the one or more programs comprising instructions that, when executed by an electronic device that is in communication with a display generation component and an input object, cause the electronic device to perform operations that include:

displaying, via the display generation component, an object having a plurality of control points displayed on portions of the object;

detecting a first portion of an input by the input object;

in response to detecting the first portion of the input by the input object:
in accordance with a determination that a location of the first portion of the input by the input object corresponds to a first control point of the plurality of control points, displaying a first tangent line corresponding to the first control point, wherein the first tangent line is displayed at a respective angle;

while displaying the first tangent line, detecting a second portion of the input by the input object, including detecting a rotational movement in a first direction along a longitudinal axis of the input object;

in response to detecting the second portion of the input by the input object:
displaying the first tangent line at a first updated angle, wherein the first updated angle is selected in accordance with the rotational movement in the first direction along the longitudinal axis of the input object and the first updated angle is different from the respective angle; and
changing a visual appearance of the object based on the first updated angle.

12. The non-transitory computer readable storage medium of claim 11, wherein the one or more programs include instructions that, when executed by the electronic device, cause the electronic device to perform operations that include:

in accordance with a determination that the location of the first portion of the input by the input object corresponds to a second control point of the plurality of control points, displaying a second tangent line corresponding to the second control point.

13. The non-transitory computer readable storage medium of claim 11, wherein the one or more programs include instructions that, when executed by the electronic device, cause the electronic device to perform operations that include:

while the first tangent line corresponding to the first control point is displayed, detecting a third portion of the input by the input object, including detecting a rotational movement in a second direction along the longitudinal axis of the input object; and in response to detecting the third portion of the input by the input object:
displaying the first tangent line at a second updated angle, wherein the second updated angle is selected in accordance with the rotational movement in the second direction along the longitudinal axis of the input object and the second updated angle is different from the first updated angle.

14. The non-transitory computer readable storage medium of claim 11, wherein, the first control point is displayed at a first location, and the one or more programs include instructions that, when executed by the electronic device, cause the electronic device to perform operations that include:
while the location of the first portion of the input by the input object corresponds to the first control point of the plurality of control points, detecting a second input by the input object including detecting a translational movement of the input object in a third direction;

in response to detecting the second input by the input object:
changing location of the first control point from the first location to a second location different from the first location; and
changing the visual appearance of the object based on the second location of the first control point.

15. The non-transitory computer readable storage medium of claim 11, wherein the input object is a stylus.

* * * * *